United States Patent [19]
Gilby

[11] Patent Number: 5,923,482
[45] Date of Patent: *Jul. 13, 1999

[54] CHANGING ASTIGMATISM IN AN OPTICAL SYSTEM

[75] Inventor: Anthony C. Gilby, Foxborough, Mass.

[73] Assignee: Waters Investments Limited, New Castle, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/815,035

[22] Filed: Mar. 14, 1997

[51] Int. Cl.⁶ .............................. G02B 5/08; G02B 7/182; G02B 26/08
[52] U.S. Cl. ........................... 359/846; 359/223; 359/871
[58] Field of Search .................... 359/846, 847, 359/849, 871, 223, 224, 868, 869

[56] References Cited

U.S. PATENT DOCUMENTS

| | | | |
|---|---|---|---|
| 3,603,671 | 9/1971 | Brown | 359/849 |
| 4,043,644 | 8/1977 | Humphrey | 359/849 |
| 4,162,825 | 7/1979 | Dowty | 359/847 |
| 4,226,507 | 10/1980 | Fuschetto | 359/849 |
| 4,647,164 | 3/1987 | Sawicki et al. | 359/849 |
| 4,993,823 | 2/1991 | Schaffer, Jr. et al. | 359/849 |

Primary Examiner—Cassandra Spyrou
Assistant Examiner—Mark A. Robinson
Attorney, Agent, or Firm—Brian L. Michaelis; Anthony J. Jeniuk

[57] ABSTRACT

The present invention selectively corrects astigmatism and is simple and inexpensive to implement. A spherical mirror is bent to simultaneously increase radius of curvature in one plane and decrease radius of curvature in the plane at right angles thereto. In one implementation the mirror disposed in a mounting that includes a plurality of abutment surfaces against which a front surface of the spherical mirror abuts to effect bending of the mirror when it is appropriately disposed in the mounting. The plurality of abutment surfaces includes at least two bending surfaces and at least two support surfaces. The bending surfaces are higher than the support surfaces, relative to a surface of the mounting from which they extend. When the mirror is appropriately disposed in the mounting, the bending surfaces push the mirror at particular bending locations at opposite sides of the mirror in the plane of incidence, while the mirror is supported by the support surfaces at two particular support locations at right angles to the plane of incidence. Mounting the mirror in contact with each of the bending surfaces and support surfaces has the effect of flattening or subtracting a cylindrical component from the curvature of the mirror in a first plane (i.e. in the plane of incidence), while steepening or adding a cylindrical component to the curvature in a second plane (i.e. at right angles to the plane of incidence).

9 Claims, 2 Drawing Sheets

CHANGING ASTIGMATISM IN AN OPTICAL SYSTEM

FIELD OF THE INVENTION

The present invention relates to spherical mirrors in optical systems, and more particularly to correcting optical aberrations introduced by such mirrors in optical systems.

BACKGROUND OF THE INVENTION

Optical systems incorporating various combinations of optical elements, i.e. lenses, gratings and mirrors, may be subject to problems resulting from optical aberrations, such as coma, astigmatism, or spherical aberration. Certain configurations of optical systems having lens-mirror combinations (e.g. monochromators or spectrographs as may be used in ultraviolet light absorbance detectors ("UV detectors"), fluorescence detectors, High Performance Liquid Chromatography (HPLC) apparatus applications or the like), suffer performance problems resulting from such optical aberrations. Such performance problems include reduced optical throughput and reduced detector signal-to-noise ratio manifested as an increase in baseline absorbance noise.

Optical implementations described in U.S. Pat. Nos. 4,932,768 and 5,089,915 to Gobeli ("the '768 and '915 patents"), seek to correct spherical aberration and other optical aberrations by applying stresses to spherical mirrors in the optical system. The '768 and '915 patents disclose an optical system comprised of a toric mirror having a first element fabricated to possess a first rigidity factor, and a second element fabricated to possess a second rigidity factor higher than that of the first element. The second element includes a front surface sized to mate with the rear surface of the first element, along an interface zone. Interface contour means produces a differential cylindrical contour within the interface zone between the first and second elements. The interface contour means is aligned to modify the X-axis radius of curvature of the spherical reflector and compression means compresses the first and second elements together to deflect the first element relative to the second element, without substantially modifying the Y-axis radius of curvature.

The first element in the '768 and '915 patents is a spherical reflector formed on an aluminum substrate. A rear surface of the substrate is flat and has a series of three drilled and tapped one quarter inch deep apertures formed at intervals along a Y-axis of the substrate. The second element also includes a series of three spaced apart apertures dimensioned to precisely mate with the apertures in the first element. Interface contour means, in the form of a plurality of specially configured shims, are disposed in the interface zone between the first and second elements, and a plurality of threaded screws engage the apertures of the first and second elements to effect compression therebetween.

Generally, the implementation in the '768 and '915 patents applies stresses to spherical mirrors in one plane in Czerny-Turner spectrometer and spectrograph optical systems to improve the quality of an image in an exit focal plane. In one embodiment, the curvature of the original sphere of the mirrors in the two mirror Czerny-Turner configuration is modified by the applied stress in one plane, but the curvature is not altered in the plane at right angles thereto. The shape of the bend resulting from the applied stress is precisely controlled with multiple specially dimensioned shims. The magnitude of the applied stress is a function of specific relationships between the specially dimensioned shims and the compression applied via the particularly located screws. Careful consideration is taken in the '768 and '915 patents to ensure that curvature is altered only in a specific mirror axis orientation, while curvature in other axis orientations is avoided.

The implementation for correcting optical aberrations as described in the '768 and '915 patents is significantly limited in applicability, in that a toric mirror is required that is fabricated from at least two discrete elements having different respective rigidity factors. The elements must be configured to form an interface zone therebetween for receiving interface contour means.

Further, the implementation in the '768 and '915 patents is limited to the two mirror Czerny-Turner configuration, and seems more concerned with reducing coma and spherical aberration than astigmatism. Indeed, the preferred embodiment described in these patents requires that the first spherical mirror be bent in the plane which actually increases astigmatism, while the second mirror is bent in the plane at right angles. It is not clear that astigmatism is eliminated in this arrangement.

Still further disadvantages are associated with the implementation described in the '768 and '915 patents in that the basic spherical mirror as disclosed is replicated onto a metal substrate in order to achieve the appropriate relative rigidity factor(s), and to facilitate threading of screws into the mirror substrate. Such an implementation is much more expensive than fabricating a mirror by conventional grinding and polishing. Furthermore, the precise relationships between the mirror elements, interface zone and compression means leads to a highly complex configuration requiring various highly sophisticated parametric considerations.

A number of configurations have been used to try to improve the basic Czerny-Turner dual mirror configuration such as described in the '768 and '915 patents. Generally, the relative complexity and high parts count mitigates against the use of such configurations in relatively low resolution applications where low cost is a primary consideration. Nonetheless, efforts have been made to eliminate optical aberrations in these dual mirror systems, for example, by substituting off-axis parabolic mirrors for the spherical mirrors, to collimate the light onto the grating and focus the dispersed (collimated) light onto the exit slit. These enhancements tend to result in very expensive optical systems.

Other efforts to eliminate optical aberrations, and more specifically astigmatism, in optical systems such as monochromators and spectrometers have included the use of a weak cylindrical lens ahead of the entrance slit which can introduce a compensating astigmatism. Such an implementation requires that the additional lens be coupled with an over-tall entrance slit so that sagittal (S-image) and tangential (T-image) images of the light source can be brought together at a flowcell. This introduces at least one extra optical component, with associated cost and complexity. Furthermore, this implementation may introduce other image defects.

Conventional Ebert and Czerny-Turner monochromators involve two reflections from one or two spherical mirrors, respectively. Generally, when this arrangement is symmetrical, coma and spherical aberration introduced by the first off-axis reflection is compensated for by the second off-axis reflection. However, astigmatism at each off-axis reflection is additive. Prior art implementations for correcting such optical aberrations are overly complicated, costly and/or ineffectual.

SUMMARY OF THE INVENTION

The present invention selectively corrects astigmatism and is simple and inexpensive to implement. The invention involves the bending of a spherical mirror to simultaneously increase radius of curvature in one plane and decrease radius of curvature in the plane at right angles thereto.

According to one embodiment of the invention, a single spherical mirror of an Ebert monochromator is bent to eliminate astigmatism. In one implementation, the mirror is disposed in a mounting that includes a plurality of abutment surfaces against which a front surface of the spherical mirror abuts to effect bending of the mirror when it is appropriately disposed in the mounting. The plurality of abutment surfaces includes at least two bending surfaces and at least two support surfaces. The bending surfaces are higher than the support surfaces, relative to a surface of the mounting from which they extend. When the mirror is appropriately disposed in the mounting, the bending surfaces push the mirror at particular bending locations at opposite sides of the mirror in the plane of incidence, while the mirror is supported by the support surfaces at two particular support locations in a plane at right angles to the plane of incidence. The plane of incidence is a plane normal to a surface of the mirror, which contains incident and reflected rays.

In accordance with the invention, mounting the mirror in contact with each of the bending surfaces and support surfaces has the effect of flattening or subtracting a cylindrical component from the curvature of the mirror in a first plane (i.e. in the plane of incidence), while steepening or adding a cylindrical component to the curvature in a second plane (i.e. at right angles to the plane of incidence).

Features of the invention include provision of a simple, low cost optical aberration correction mechanism for astigmatism. The simple mounting arrangement according to the invention works well with a single glass mirror since no threaded holes are required. The single mirror implementation involves an inexpensive optical mirror and mounting, which requires virtually no additional cost compared to a conventional, uncorrected monochromator. The centers of curvature of the mirror are determined by the location of the bending and support surfaces against the mirror's polished surfaces, therefore, there is no need for close tolerances between the mirror blank outside diameter and a cavity in the mounting receiving the mirror, or on the thickness of the mirror blank. Detectors can be implemented according to the invention having minimized flowcell volumes for a given pathlength, while having the highest possible optical throughput. The invention can be implemented in mirrors without any restriction on the material from which the mirror is fabricated, e.g. Pyrex or metal.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
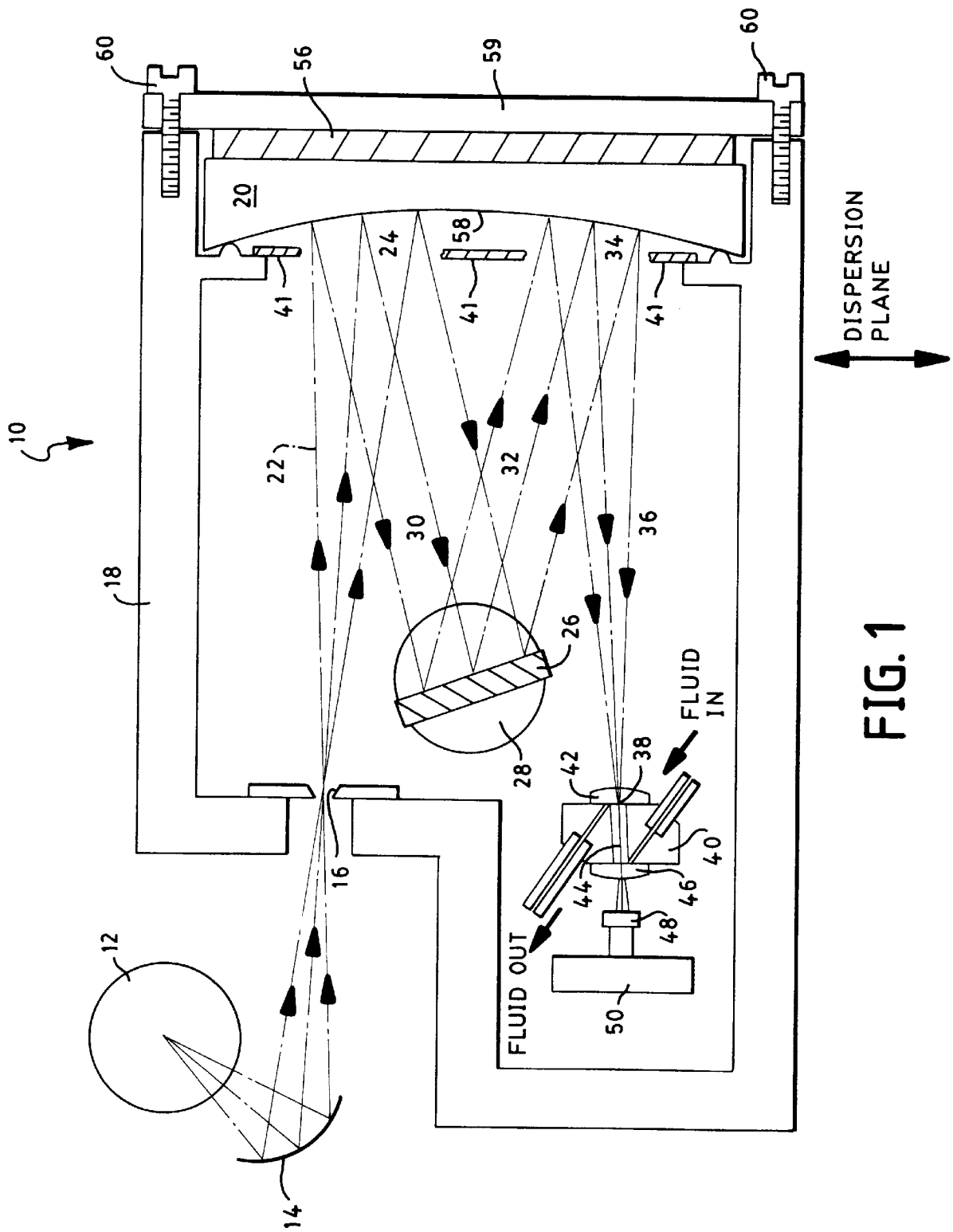
FIG. 1 is an optical schematic diagram of an illustrative single mirror Ebert monochromator absorbance detector configuration for implementing astigmatism removal according to the invention.

As illustrated in FIG. 1, astigmatism correction according to the invention is implemented in the context of an Ebert monochromator 10 of well known design. The Ebert monochromator illustrated may be configured as part of an absorbance or fluorescence detector for a flowing sample, as might be found in High Performance Liquid Chromatography apparatus.

Light (UV, visible or IR) from a light source 12 is focused by a mirror 14 onto an entrance slit 16 of the Ebert monochromator 10, which is housed in an enclosure 18. A large, spherical mirror 20 is disposed at an end of the enclosure 18. Light rays 22 strike the large spherical mirror 20 at a first location 24 on the curvature of the mirror 20.

A plane diffraction grating 26 is disposed on a rotatable mount 28 positioned substantially centrally with respect to the curvature of the mirror 20. The mirror 20 is approximately one focal length from the entrance slit 16, and is configured to direct a collimated light beam 30 towards the diffraction grating 26. The collimated light beam 30 hits the grating 26 resulting in diffracted light leaving the grating. The grating 26 disperses the light in the plane of FIG. 1, which is also the plane of incidence of the mirror 20. A collimated beam of diffracted light 32 of one selected wavelength (which depends on the groove density and angle of the grating 26), strikes the mirror 20 at a second location 34 on the curvature of the mirror. Reflected rays 36 of the selected wavelength leave the second location 34 of the mirror 20 and are brought to a focus at an entrance 38 of a flowcell 40. A mask 41, to control stray light, covers the mirror 20 except for the two openings at the first location 24 and the second location 34.

The flow cell 40, in this illustrative implementation of an absorbance detector, receives the reflected rays 36 of the selected wavelength which enter the flowcell 40 via an entrance window 42. The entrance 38 of the flowcell constitutes an exit slit of the monochromator 10. To preserve good spectral resolution, the cell 40 is located so that the entrance 38 coincides with the tangential (T) image of the entrance slit 16 of the Ebert monochromator 10. The flow cell 40 contains a fluid to be analyzed, in a channel 44. The reflected rays 36 entering the flowcell 40 through the entrance window 42 pass through the fluid in the flowcell 40 and exit the flowcell at an exit window 46. A photodetector 48 receives at least some portion of the rays 36 passing through the fluid and exiting the flowcell at the exit window 46. A photocurrent generated by the photodetector 48, as a function of the light hitting it, is amplified by a preamplifier 50 for subsequent digitization, measurement and display as known in the art. Not illustrated in FIG. 1, and well understood by those skilled in the art, is a beamsplitter ahead of the flowcell 40 used to divert a portion of the light to a reference detector, to ensure that fluctuations in the light source will not degrade the measurement of sample absorbance.

In general, from an optical system standpoint, optimal light throughput for a flowcell of a given volume and pathlength is achieved when one end of the cell (i.e. at the entrance 38) is a primary field stop and the other end of the cell (i.e. at the exit window) is a primary aperture stop of the optical system (or the ends of the flowcell are conjugate with these stops). Optical aberrations can undermine this optimization strategy.

In the Ebert monochromator of this illustrative embodiment, the entrance slit 16 and the exit slit 38 are on either side of the grating 26. Optically, the collimated light beam 30 incident on the grating 26 is collimated by a first reflection from the first location or portion 24 of the spherical mirror 20, and the diffracted light 32 is brought to a focus in the plane of the exit slit 38 by a second reflection from the second, different location or portion 34 of the spherical mirror 20. Because of the symmetry of the arrangement, coma and spherical aberration introduced by the first (off-axis) reflection, are substantially compensated for by the second (off-axis) reflection. Thus the system forms a good line image of the entrance slit 16 at the position of the exit slit 38. However, astigmatism is not compensated and increases with each off-axis reflection. The result is a narrow and elongated (i.e. extended in height) tangential image (T-image) which is placed on the exit slit. As a further result of astigmatism, a sagittal image (S-image) which is well-defined in height but broadened in width is formed beyond the T-image, after the exit slit 38. The location of the flow cell entrance (exit slit 38), as described hereinbefore, is chosen so that the T-image is coincident therewith because the narrow width of the T-image favors good spectral resolution.

The exit slit 38 is the entrance aperture of the flowcell 40. The height of the cell entrance aperture (which is also its diameter in a conventional circular cross-section flowcell) is desirably selected to be small in order to keep cell volume small and reduce band spreading, and in order to facilitate good spectral resolution. If the image of the entrance slit at the exit slit or entrance of the flow cell is extended in height because of the astigmatism, optical throughput is reduced. This in turn reduces the detector signal-to-noise ratio, seen as an increase in baseline absorbance noise.

Stressing or bending the mirror 20 according to the invention, brings the S-image and the T-image together at a location (z-coordinate) midway between them. The resulting image has the width of the astigmatic T-image and the height of the astigmatic S-image. In other words, the resulting image is a near-perfect image.

Figure 2:
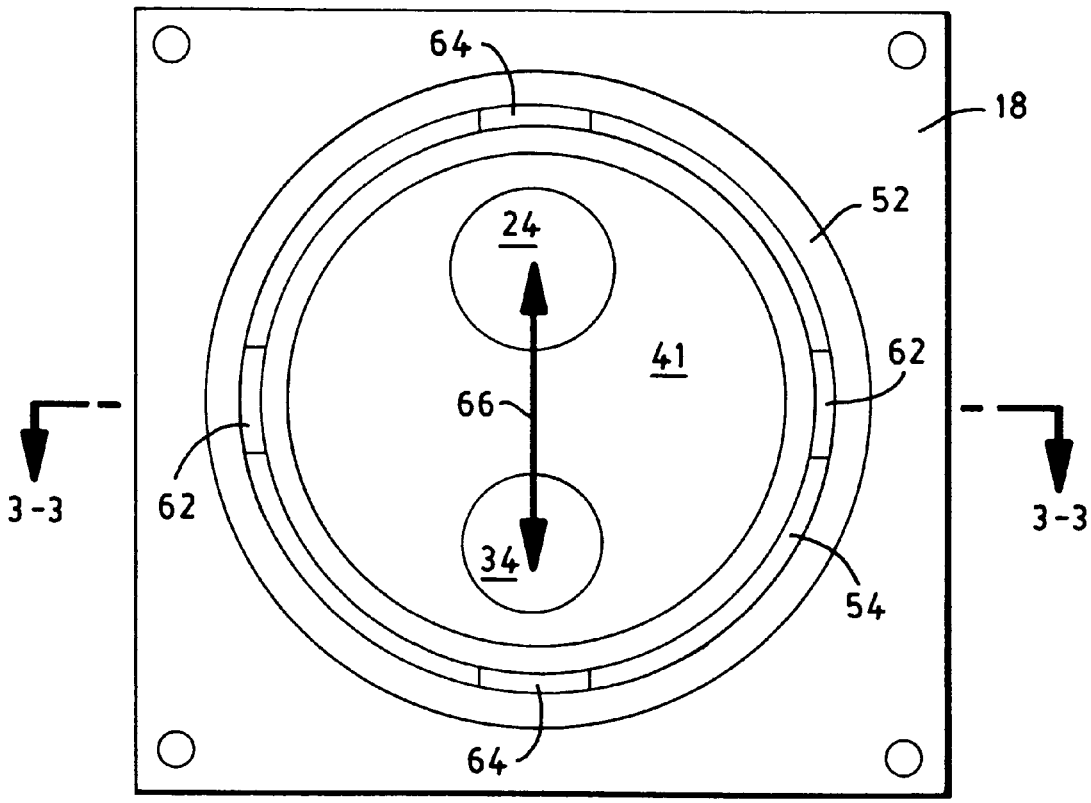
FIGS. 2 is a front end view of the single spherical mirror mounting modified according to the invention to effect bending of the mirror for astigmatism correction in the Ebert monochromator of FIG. 1.

Referring now to FIG. 2, a mounting for the large spherical mirror 20 is implemented in this illustrative embodiment of the present invention in a manner which stresses or bends the mirror 20 to effect correction of astigmatism. The single mirror 20 is a large (three inch diameter) inexpensive optical mirror having a polished spherical curved surface, and is conveniently made from a circular Pyrex blank.

The mirror 20 fits within a mounting comprising a circular cavity 52, and rests, as illustrated in FIG. 1, on a raised annular rib 54. The polished, spherical surface 58 (best seen in FIGS. 1 and 3) of mirror 20 includes a raised edge which provides a line of contact with the annular rib 54. This ensures that the center of curvature of the mirror 20 is at a well defined location, established by the mirror's radius of curvature and the machining accuracy of the rib 54. Close tolerances between the mirror blank outside diameter and the cavity 52, or on the thickness of the mirror are not required. The mirror is held in place against the mounting rib 54 by a compressible rubber pad, or large compressible wave washer 56, which in turn is secured by an end plate 59 and screws 60.

To implement the invention as illustrated in FIG. 2, the mounting rib 54 is configured to include two support surfaces 62 and two bending surfaces 64. The surfaces are disposed approximately 90 degrees apart. In this illustrative embodiment, the two support surfaces are disposed at opposite sides of the mirror perpendicular to the plane of incidence, i.e. the plane containing the entrance and exit slits 16, 38, flowcell 40 and grating 26. The two bending surfaces 64 are disposed at opposite sides of the mirror in the plane of incidence. The level or height of the support surfaces 62 relative to the surface of the mounting rib 54 is slightly lower than the level of the bending surface 64, to effect bending. In this illustrative embodiment, a height difference of about 0.005" is implemented between the bending surfaces 64 and the support surface 62 to provide the necessary bending.

The surfaces 62, 64 are implemented in this illustrative embodiment very inexpensively, by machining away portions of the annular mounting rib 54 leaving the two support sections 62 perpendicular to the dispersion plane and the two bending sections 64 in the dispersion plane (the dispersion plane is indicated in FIG. 2 by double arrow 66). The dispersion plane is also the plane of incidence of the mirror 20, defined as the plane containing the incident and reflected rays, which is perpendicular to the mirror surface at the point of reflection. The two support surfaces 62 are then carefully machined down a small distance below the level of bending surfaces 64. The exact amount (i.e. a few thousandths of an inch in the present embodiment) determines the extent to which the mirror 20 will be bent.

Figure 3:
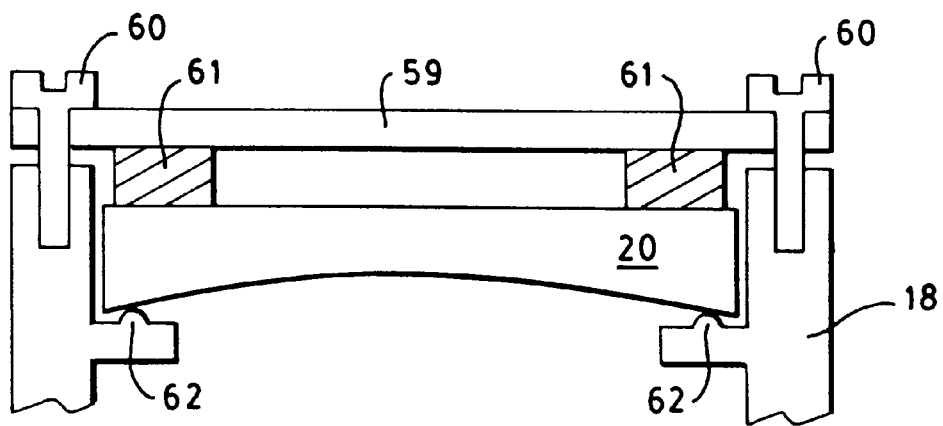
FIG. 3 is sectional view of the mirror mounting of FIG. 2, taken along a line 3—3.

When the mirror 20 is installed but unsecured in the cavity 52, it rocks about a line or axis through the two bending surfaces or sections 64. The relaxed mirror does not simultaneously touch the support surfaces or sections 62. This condition is illustrated in FIG. 3. The compressible rubber pad, or large compressible wave washer 56, can be placed between the end plate 59 and the back of the mirror 20. When the screws 60 bring the plate 59 into contact with the housing 18, the mirror 20 is bent so that it is in contact with the support sections 62 of the mounting rib 54. The compressible pad 56 can be replaced by a pair of small force transmitting pads 61, illustrated in FIG. 3, disposed behind the mirror 20 opposite the support surfaces 62. The washer 56 or pads 61 are pushed by the mirror cover plate 59 against the back of the mirror 20 until the mirror surface bottoms out on all four surfaces. The mirror 20 is thus supported in its bent form at four points, including each of the support surfaces 62 and bending surfaces 64.

Without the astigmatism correction according to the invention, light rays 22 and collimated diffracted light 32 strike the mirror 20 making a significant angle with the normal at their respective points of reflection. The image of entrance slit 16 formed at the flowcell entrance 38 (which serves as the monochromator exit slit) suffers from astigmatism. Because, prior to the invention, the T-image was extended in length in the direction perpendicular to the dispersion plane one of two undesirable choices had to be made. Either fewer rays would be permitted to pass through the flowcell, or else the flowcell volume would have to be increased. Given the nature of detector implementations, the practical reality is that it is most desirable to minimize flow volume, while it is desirable to have as high an irradiance as possible on the flowcell.

With the astigmatism correction according to the invention, mirror 20 is bent in such a way as to increase its curvature, i.e. add a cylindrical component to curvature, perpendicular to the dispersion plane. This has the effect of pulling the S-image (which falls beyond the T-image, is extended in width, but is in good focus in height), towards mirror 20. At the same time the bend causes the mirror curvature to be reduced in the dispersion plane to subtract a cylindrical component, which has the effect of pushing the T-image away from mirror 20. Just the right amount of bending, which can be chosen by calculation as known in the art, or experimentation, causes the S and T images to come together into a near-perfect image of the monochromator entrance slit. The location of this desired image is between the S and T images formed by the unbent mirror.

Accordingly, the location of the desired image, i.e. an optimized location, is selected as the location for the entrance of the flowcell. The image of entrance slit 16 formed at the optimized location of the flowcell entrance does not suffer from astigmatism.

It should be appreciated by those skilled in the art that astigmatism correction according to the invention should be equally applicable in contexts other than the Ebert monochromator described herein. For instance, in a Czerny-Turner grating mount configuration known in the art the single spherical mirror is replaced by two separate, smaller spherical mirrors, each of which could have mounts modified to provide astigmatism correction according to the invention.

While the astigmatism correction according to the invention is described herein in the context of an absorbance detector, the concepts can be equally well applied to other types of detectors and instrumentation, such as Raman, emission, fluorescence excitation in HPLC, or the like.

Although the astigmatism correction mechanism described herein includes a plurality of abutment surfaces comprised of at least two bending surfaces and at least two support surfaces, it will be appreciated that other pluralities of surfaces could be implemented. That is, more than two bending surfaces and/or more than two support surfaces could be incorporated.

While it is described hereinbefore that the bending surfaces push the mirror at particular bending locations, i.e. at opposite sides of the mirror in the plane of incidence, while the mirror is supported by the support surfaces at two particular support locations, i.e. two locations near edges of the mirror perpendicular to the plane of incidence, it will be appreciated that alternative locations for support and bending may be implemented as a function of the application and configuration.

Although the bending and support surfaces described herein are described as fabricated by machining the surface of an annular rib in the mirror mounting, it will be appreciated that the bending and support surfaces may be implemented in a portion of a mirror mounting other than an annular ring, depending upon the configuration of the mounting. Similarly, it will be appreciated that the surfaces can be implemented by a process other than by machining, such as by casting an appropriate mounting, or installing the surfaces by way of inserts, spacers, tabs or the like, fixedly or removably attached to the mounting or to the mirror(s).

While the mirror described in the illustrative embodiment is mounted in contact with each of the bending surfaces and support surfaces to effect flattening or subtracting a cylindrical component from the curvature of the mirror in the plane of incidence, while steepening or adding a cylindrical component to the curvature in a plane perpendicular to the plane of incidence, it will be appreciated that the bending and flattening can be effected in other mutually orthogonal axes depending on the orientation of the implementation, or the bending and flattening may be implemented in other than mutually orthogonal axes depending upon the application.

While the illustrative embodiment described herein includes a plurality of abutment surfaces disposed to contact a front surface of the spherical mirror, it will be appreciated that bending of the mirror according to the invention can be effected by including bending and support surfaces at alternative locations, such as at a back portion or portions of the mirror.

Furthermore, although the mounting is described herein as having a backing plate attached by screws and having a compressible washer or tabs disposed between the plate and the mirror, it will be appreciated that mechanical fastening means other than screws and a backing plate can be implemented for fastening the mirror in a mount, for instance a plurality of tabs or other surfaces could be implemented for engaging the mirror in the mounting. Similarly, the compressible washer or tabs resiliently exerting forces on the mirror to effect bending can be alternatively implemented using other resilient members or biasing means, such as springs, spacers, wedges or the like, which can be removably or fixedly attached to a portion of the mounting or the mirror.

It will be appreciated that while the invention is described herein as being useful for correcting astigmatism in an optical system, it can be implemented as well to easily and inexpensively introduce controlled astigmatism into, or change astigmatism in, an optical system by controlling the relationship between the saggital image and tangential image formed by off-axis reflection(s) in the system.

Although the invention has been shown and described with respect to exemplary embodiments thereof, various other changes, omissions and additions in form and detail thereof may be made without departing from the spirit and scope of the invention.

What is claimed is:

1. A method for controlling astigmatism in an optical system, comprising the steps of:

providing a substantially symmetrical spherical mirror including a curved surface intersected substantially at right angles by a first plane, and a second plane substantially perpendicular to said first plane and to said curved surface, said first plane aligned with a plane of incidence of said spherical mirror, said plane of incidence including incident light beams and reflected light beams, said spherical mirror further including a raised edge;

providing off-axis beams of light onto said spherical mirror causing astigmatism in said reflected light beams:

providing a mounting including an annular rib having at least two support surfaces and at least two bending surfaces, said at least two bending surfaces having a height higher than said at least two support surfaces;

providing a biasing member to bias said raised edge of said spherical mirror against said annular rib of said mounting to effect, bending of said spherical mirror on said at least two bending surfaces in said first plane to subtract a selected amount of curvature from said spherical mirror in said first plane; and supporting of said spherical mirror on said at least two support surfaces in said second plane to add said selected amount of curvature to said spherical mirror in said second plane;

said bending and supporting steps controlling separation between a sagittal image and a tangential image formed by said spherical mirror and controlling said astigmatism introduced by said spherical mirror.

2. The method of claim 1 wherein said first plane is a plane of incidence substantially through the center of said mirror where incident rays and reflected rays contact said mirror, said second plane is substantially perpendicular to said first plane and substantially through the center of said mirror, and said bending and supporting steps correct astigmatism by causing said saggital image and said tangential image formed by said mirror to be brought together at a coincident location.

3. The method of claim 1 wherein said at least two bending surfaces against which a portion of said mirror is held in abutment are respectively disposed proximate to opposite edges of said mirror in said first plane.

4. The method of claim 1 wherein said at least two support surfaces against which a portion of said mirror is held in abutment are respectively disposed proximate to opposite edges of said mirror in said second plane.

5. An apparatus for controlling astigmatism in an optical system, comprising:

a substantially symmetrical spherical mirror including a curved surface having a plane of incidence wherein incident rays and reflected rays contact said mirror, and a second plane substantially perpendicular to said plane of incidence and substantially through the center of said spherical mirror, said spherical mirror further including a raised edge;

a light source providing an off-axis beam of light to said spherical mirror causing astigmatism in said reflected rays;

a mounting including an annular rib having a plurality of abutment surfaces against which a surface of said spherical mirror abuts to effect bending of said spherical mirror when it is secured in said mounting, said plurality of abutment surfaces including two bending surfaces and two support surfaces; and mechanical fasteners securing said spherical mirror in said mounting with said raised edge of said spherical mirror in abutment with said plurality of abutment surfaces substantially simultaneously decreasing by a selected amount curvature in said spherical mirror in said plane of incidence and increasing, by said selected amount, curvature in said spherical mirror in said second plane at right angles to said first plane, thereby controlling astigmatism introduced by said mirror.

6. The apparatus of claim 5 wherein said optical system is an Ebert monochromator comprising a single mirror that is bent to correct astigmatism.

7. The apparatus of claim 5 wherein said at least two bending surfaces are higher than said at least two support surfaces relative to a surface of said mirror against which said abutment surfaces abut.

8. The apparatus of claim 5 wherein when said spherical mirror is disposed in said mounting, said at least two bending surfaces push said spherical mirror at bending locations in said plane of incidence at edge portions of said spherical mirror, while said spherical mirror is supported by said at least two support surfaces at two support locations proximate to edges of said mirror in said second plane.

9. The apparatus of claim 5 wherein said surface of said spherical mirror which abuts against said plurality of abutment surfaces to effect bending is a front reflective surface of said mirror.

* * * * *